Nov. 24, 1959   D. B. CLAPP ET AL   2,914,577
HALOGENATION OF OLEFINS
Filed May 6, 1957   3 Sheets-Sheet 1
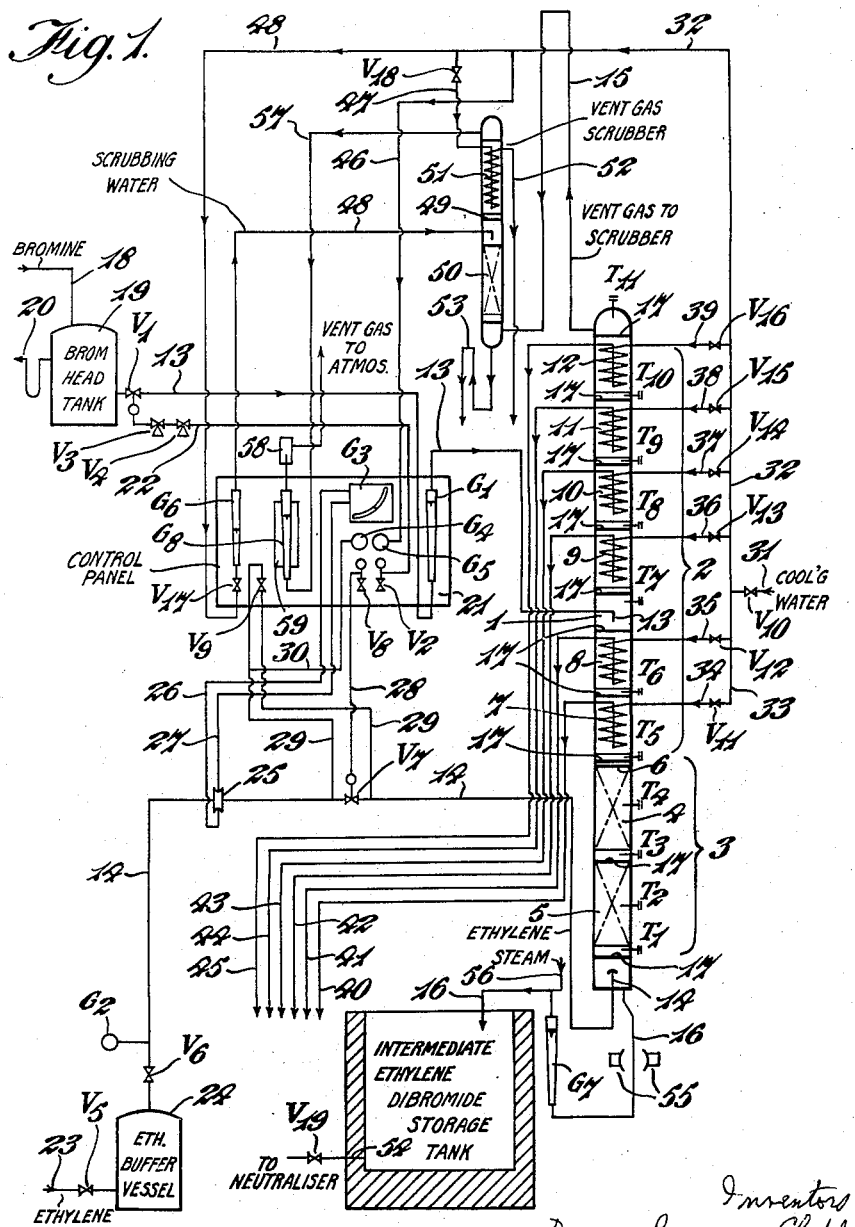

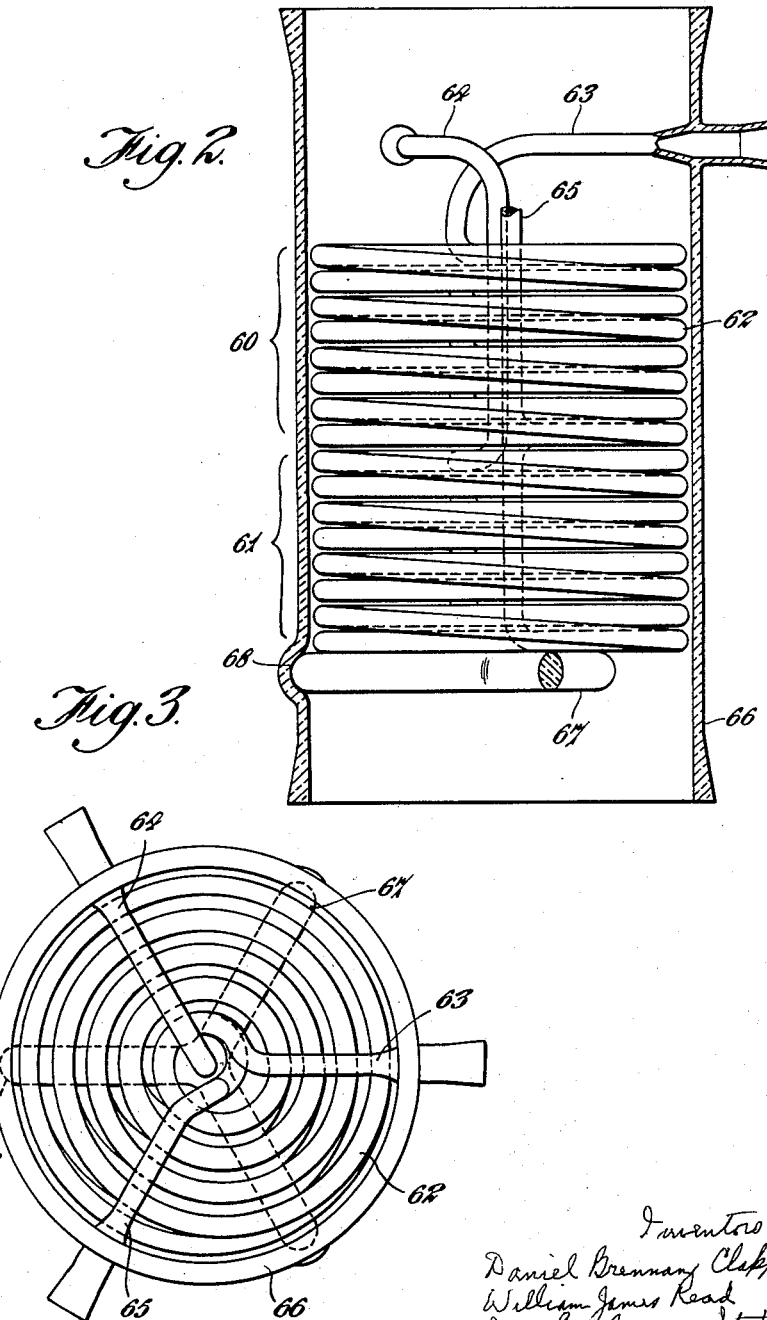

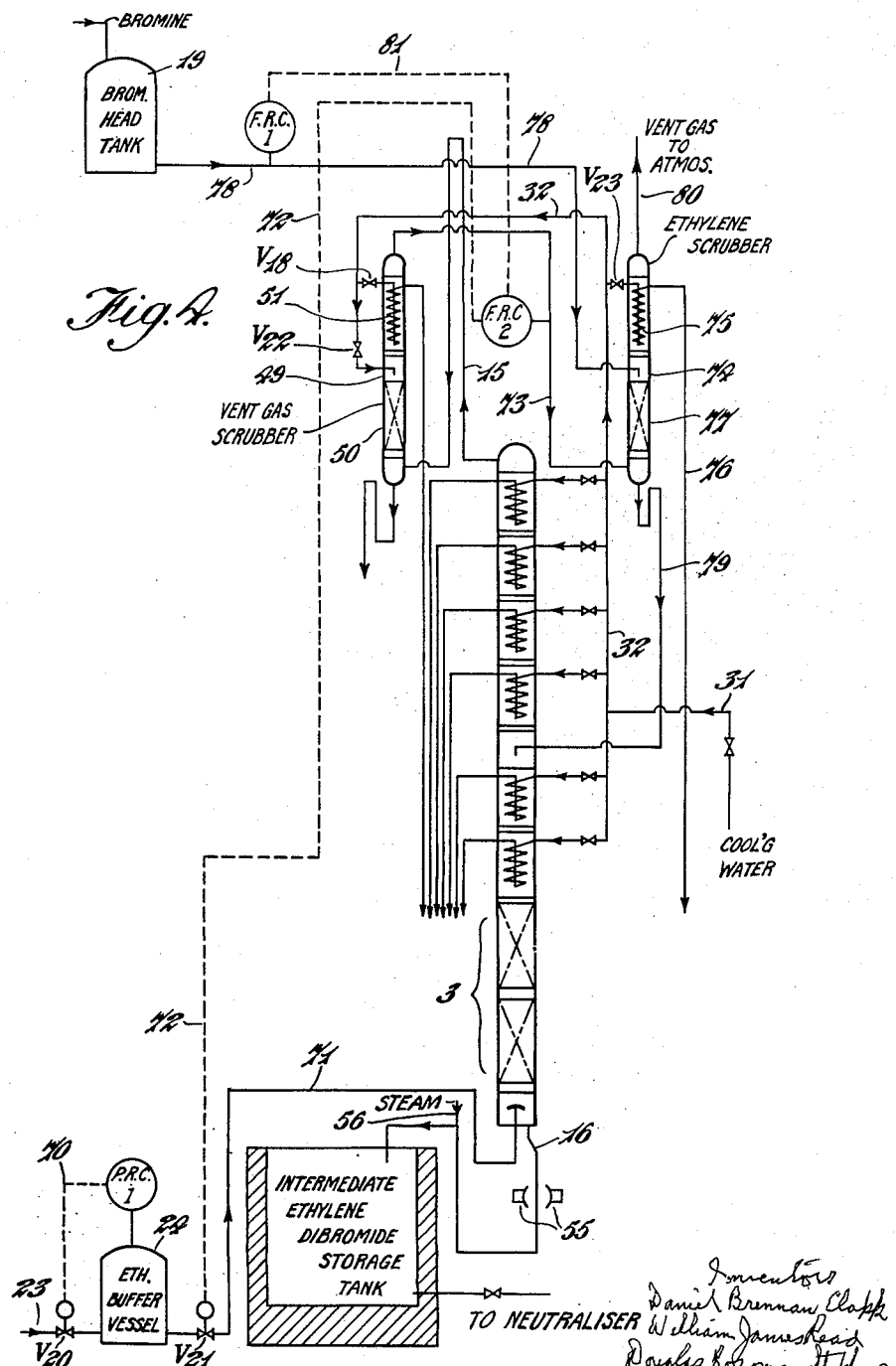

United States Patent Office 2,914,577
Patented Nov. 24, 1959

2,914,577

HALOGENATION OF OLEFINS

Daniel Brennan Clapp, London, and William James Read, Douglas Rosoman Stephens, and John Edward Russell, Cheshire, England, assignors to The Associated Ethyl Company Limited, London, England Application May 6, 1957, Serial No. 657,387

Claims priority, application Great Britain July 28, 1955

15 Claims. (Cl. 260—660)

This invention is concerned with a novel process and apparatus for conducting chemical reactions. More particularly, but not exclusively, this invention is concerned with a novel process and apparatus for the halogenation of normally gaseous olefins in a continuous manner, especially the bromination of ethylene to produce ethylene dibromide.

The present application is a continuation-in-part of our copending application Serial No. 537,512, filed September 29, 1955, now abandoned.

In the past, the conventional procedure for preparing ethylene dibromide has been a batch process involving reaction between ethylene and liquid bromine. In such a batch process, a tank is charged with liquid bromine and ethylene is bubbled up through the tank until substantially all the bromine has been converted to dibromide. The reaction is highly exothermic and it is necessary to provide for an extensive system of heat exchangers in the batch reactor; this adds to the cost of the reactor and, more important, complicates maintenance since in practice breakages and leakages in the internal cooling system of the reactor are quite common occurrences due to vibration in the reactor. A further disadvantage of the batch process is that the residence time of the charge in the reactor is necessarily long—for example, a residence time of 16 hours or so is typical for a batch reactor having a product capacity of about 3.7 tons of ethylene dibromide—and this leads to the formation of by-products which impair the quality of the ethylene dibromide. It will thus be apparent that there is a great need for an improved process for preparing ethylene dibromide which is not subject to the disadvantages necessarily associated with the present batch process and it is the main object of the present invention to provide such an improved process together with an apparatus for use therein.

In accordance with the principal aspect of this invention, there is provided a continuous process for the preparation of ethylene dibromide by the reaction of bromine and ethylene which comprises continuously introducing bromine and ethylene into a reaction zone provided interiorly with heat exchange means which present a large expense of cooling surface area per volume of free reactor space, withdrawing heat through the surface of said heat exchange means at a rate conducive to the continuous formation of liquid ethylene dibromide in the vicinity thereof and establishing contact between bromine, ethylene and product dibromide while the latter flows downwardly, as a discontinuous liquid phase, over the surface of said heat exchange means. By making appropriate changes in the olefin and halogen reactants, the above process may be applied quite generally to the preparation of bromine- and/or chlorine-containing dihalides of normally gaseous olefins.

In contrast to the batch procedures heretofore conventionally used, the liquid in the reaction zone of the present process is essentially maintained as a discontinuous phase which flows over the surface of the heat exchange means. In other words, the reaction zone is at no time flooded with liquid so that there exists a continuous gas phase throughout the reaction zone. The maintenance of a discontinuous liquid phase in the reaction zone may be readily achieved by appropriate control of the feed rates of olefin and halogen.

A further distinctive feature of the present process is that the average residence time of the product dihalide in the reaction zone is relatively low. This represents a departure from accepted practice for ethylene dibromide manufacture according to which the halogenation reaction is carried out in the presence of a large bulk of product as the reaction medium such product being either formed in situ and retained in the reaction zone or extraneously added in large amounts along with the halogen feed. The fact that, in the present process, low product residence times may be achieved has been found, as will appear hereinafter, to result in much superior product quality.

In general, the stream of product dihalide leaving the reaction zone will contain dissolved halogen, in some cases in appreciable amounts. Such dissolved halogen may be removed in any convenient manner but it has been found advantageous to remove it continuously by countercurrent contact with the incoming olefin feed.

Although the advantages of a continuous process for preparing ethylene dibromide have been manifest for many years and indeed although one such process has been previously proposed, it is believed that the present invention provides the first continuous process which really offers outstanding advantages in terms of ease of control, rate of production and purity of product, over the conventional batch process and which is truly feasible commercially.

According to preferred practice, the new continuous process as applied to the manufacture of ethylene dibromide is carried out by introducing bromine and ethylene into a vertical column having a lower packed zone and an upper reaction zone which contains at least one condenser or heat exchanger of large surface area, the bromine being fed as a liquid stream into the reaction zone and the ethylene upwardly through the packed zone and thence into the reaction zone wherein ethylene dibromide is continuously formed by virtue of a heterogeneous reaction taking place on the coding surface of the heat exchanger and a homogeneous liquid phase reaction taking place in a medium of product dibromide, and to some extent a homogeneous vapour phase reaction. The liquid ethylene dibromide product formed in the reaction zone and which contains a relatively large amount of dissolved bromine flows downwardly as a discontinuous liquid phase, over the surface of the heat exchanger into the packed zone wherein it is countercurrently contacted, again as a discontinuous liquid phase, with ascending ethylene which vaporizes out the major portion of the dissolved bromine and returns it to the reaction zone, a stream of substantially bromine-free product dibromide being withdrawn from the bottom of the packed zone. It is to be understood that the packed zone functions primarily as a stripping column for the unreacted bromine although some reaction does occur here. Preferably, liquid gravity fed bromine is introduced as a stream into the reaction zone at a point above at least one heat exchanger, further heat exchangers being situated above the point of bromine feed. The ethylene feed which may be pure or which may contain reactive and/or inert impurities such as paraffins is conveniently introduced, at slightly above atmospheric pressure and at room temperature, into the base of the column below the packed zone.

The reaction between ethylene and bromine is highly exothermic and, furthermore, has a negative temperature coefficient so that the reaction rate falls off appreciably as the temperature is increased. The heat exchanger surface provided in the reaction zone thus functions primarily to remove heat of reaction, although it also promotes heterogeneous reaction between bromine and ethylene and causes condensation of vaporized bromine and ethylene dibromide, thus preventing losses of both these substances in the effluent gas issuing from the top of the column.

As regards the reaction temperatures employed, the general range is from 10–150° C. Preferably the reaction zone is cooled so that the maximum temperature reached does not exceed 150° C. or better still does not exceed 100° C. The reaction is advantageously carried out at substantially atmospheric pressure although sub- and super-atmospheric pressures may be employed. The molar feed ratio of bromine to ethylene may vary from 1.25:1 to 1:2. Commercially, however, it is desirable to use substantially equimolar proportions of ethylene and bromine or a slight molar excess, not exceeding about 10%, of ethylene. Feed rates of ethylene and bromine will depend on the rate of production desired. In all cases, however, feed rates of ethylene and bromine will be such as to avoid liquid flooding as the efficiency of the process is seriously affected if a continuous liquid phase is permitted to build up.

The new continuous process for ethylene dibromide manufacture is conveniently carried out in apparatus which comprises a vertical column provided with a packed stripping zone in the lower portion thereof and at least one interiorly disposed heat exchanger of large surface area in the upper portion thereof. The vertical column is also provided with inlets for the reactants respectively above (for bromine) and below (for ethylene) the packed zone, there being an outlet for product dibromide at the bottom of the column and an outlet at the top for vent gases. Preferably, the column contains a number of superimposed heat exchangers above the packed zone, the bromine inlet being located above at least one of such exchangers. The column and heat exchangers will preferably be constructed of glass, primarily because glass if resistant to chemical attack and, secondarily, because there are indications that a glass surface favours a heterogeneous reaction between ethylene and bromine. Furthermore, by constructing the column of glass, light is admitted to the interior thereof and this has a quite surprising effect on the reaction rate. Each heat exchanger is, by preference, constructed of a number of superimposed series connected, spirally wound tubular coils (i.e. "Pancake" coils) which extend horizontally across a substantial portion of the cross-sectional area of the reaction zone and which also extend vertically to a substantial depth thereby providing, in effect, a packed reaction zone conductive to intimate contact between the reactants throughout the reaction zone. As regards the packed stripping zone, any conventional packing pieces may be employed but those preferred are glass Raschig rings. As an operational expedient, it is desirable to insert a perforated plate above the packed zone to restrain the packing against upward movement in the event of accidental flooding of the packed zone. In some cases it may also be desirable to employ different sized packing pieces in different vertical sections of the packed zone. Since the apparatus in use must permit of the countercurrent flow of gas and a discontinuous liquid phase, it follows that the apparatus must be free of transversely extending obstructions, e.g. baffles, such as would cause localised flow of liquid hold-up and flooding. Quite generally, what is required is that a flow path be provided which is adapted to permit a downward liquid flow (and an upward gas flow) which is distributed, preferably evenly, over substantially the whole cross-sectional area of the column from and through the heat exchangers to the bottom of the packed zone.

The apparatus above described is believed to be entirely novel, particularly in regard to the arrangement therein of heat exchangers and packing, and although such apparatus is particularly adapted to the production of ethylene dibromide in a manner which will be described in detail later, it is also applicable in certain cases with appropriate modifications of arrangement of parts and additions to and/or changes in ancillary equipment, to the bromination of other normally gaseous olefins to the corresponding olefin dibromides, as for example the bromination of propylene to propylene dibromide as well as to a variety of other chemical reactions. Also, the apparatus suggests itself as being applicable to reactions involving the halogenation of olefins such as the formation of ethylene chlorobromide or propylene chlorobromide from the appropriate olefin and an equimolar mixture of chlorine and bromine, and the chlorination of ethylene or propylene to form the corresponding dichloride.

The new continuous process of the invention and apparatus therefor will be more fully understood from the following detailed description of a preferred practical embodiment, reference being made in such description to the accompanying drawings in which:

Figure 1 shows a flow sheet for the process and a system for manually controlled operation.

Figure 2 shows in elevation a suitable form of glass heat exchanger for use in the reactor of Figure 1.

Figure 3 shows a plan view of the heat exchanger of Figure 2, and

Figure 4 shows a similar flow sheet to that of Figure 1 but embodying a system for automatically controlled operation.

Referring now to Figure 1 of the drawings, the reactor employed is a cylindrical glass column 1 divided into a reaction zone 2 and a packed zone 3 containing upper and lower packed sections 4 and 5 provided with suitable packing pieces which may be of the same or different size in the two sections. The packing in section 4 is restrained from upward movement by a slotted perforated plate 6. The reaction zone 2 contains a series of glass heat exchangers 7, 8, 9, 10, 11 and 12 each of which is constructed of a bank of superimposed series connected, spirally wound coils (i.e. "Pancake" coils) which occupy most of the cross-sectional area of the column 1 but which, at the same time, provide flow paths for downflow of liquid and upflow of gases. An inlet line 13 is provided above cooling coil 8 for gravity fed liquid bromine and a further inlet line 14 at the bottom of column 1 serves for the introduction of gaseous ethylene. Outlets 15 and 16 are provided at the top and bottom of column 1 for the removal of vent gas and liquid product ethylene dibromide respectively. Thermometers $T_1$—$T_{11}$ are, as shown, provided at spaced points throughout the column 1. For ease of maintenance, column 1 is made in sections separated by gaskets 17 which are preferably asbestos composition rings sheathed with polytetrafluoroethylene. The surfaces sealed by gaskets 17 are specially smoothed to ensure a good seal and thus avoid leakage of bromine.

Bromine is admitted to the system via line 18 to a bromine head tank 19 provided with overflow line 20. From head tank 19 bromine is gravity fed at a constant head through line 13 into the reactor. Flow of bromine through line 13 is measured by a rotameter $G_1$ mounted on a central control panel 21 and rate of bromine flow is controlled by an air-operated valve $V_1$ which in turn is controlled through an air line 22 by an air valve $V_2$ situated on control panel 21. Two emergency cut-off valves $V_3$ and $V_4$ are also situated in air line 21.

Gaseous ethylene is admitted to the system through a main supply line 23 and release valve $V_5$ into an ethylene buffer vessel 24 whence it passes into the bottom of column 1 through line 14 which is provided with a control valve $V_6$, a pressure gauge $G_2$, an orifice plate type of flow measuring device 25 and an air-controlled valve $V_7$. Measuring device 25 is connected through lines 26 and 27 to an ethylene flow meter $G_3$ situated on control panel 21 and valve $V_7$ is operated through air line 28 from air valve $V_8$ also situated on control panel 21. Fine control over the flow of ethylene into column 1 is provided for by means of a line 29 by-passing air-controlled valve $V_7$, ethylene flow through line 29 being controlled by a valve $V_9$ situated in control panel 21. An ethylene pressure gauge $G_4$ on control panel 21 is connected to ethylene supply line 14 on the inlet side of valve $V_7$ via line 29 and branch line 30.

Cooling water is supplied to the system through line 31 and main control valve $V_{10}$. Line 31 is split into two branch lines 32 and 33 which supply cooling coils 7—12 in column 1 via lines 34—39 and individual control valves $V_{11}$—$V_{16}$. Effluent water from cooling coils 7—12 is discarded from the system through lines 40—45. Branch water line 32, which is provided with a pressure gauge $G_5$ situated on control panel 21 and supplied through lines 46, is further branched into lines 47 and 48 which supply water to a vent gas scrubber 49 which is a glass column having in its lower portion a packed scrubbing zone 50 and in its upper portion a condenser 51. Scrubbing zone 50 is supplied with water through line 48 via valve $V_{17}$ and rotameter $G_6$ both of which are situated on control panel 21, while condenser 51 is supplied through line 47 via valve $V_{18}$. Effluent water from the condenser 51 and from the bottom of scrubbing zone are withdrawn from the system through lines 52 and 53 respectively.

Product ethylene dibromide withdrawn from the bottom of column 1 through line 16 is passed via a rotameter $G_7$ to an intermediate ethylene dibromide storage tank whence it is passed via line 54 and valve $V_{19}$ to a neutraliser (not shown). Line 16, together with the other lines in the system carrying corrosive materials, is constructed of glass, and in close proximity thereto a pair of mercury vapour lamps 55 are arranged to illuminate the stream passing through line 16. Provision is also made to inject steam into line 16 through a steam supply line 56.

The vent gas issuing from the top of column 1 through line 15 is admitted into the bottom of the scrubber 49 whence it is withdrawn through line 57 to atmosphere via a rotameter $G_8$ on control panel 21 and a trap 58. To prevent condensation in rotameter $G_8$, it is provided with a heated jacket 59.

Referring now to Figures 2 and 3, these show a preferred construction of heat exchanger for use in the reactor of Figure 1. In the construction shown, the heat exchanger consists of two sets 60 and 61 of eight spirally wound series connected glass tubular coils 62. The two sets of coils are provided with separate inlet tubes 63 and 64 for cooling water and a common outlet tube 65. The heat exchanger is housed in a cylindrical glass jacket 66 which constitutes one of the several sections of which the reactor of Fig. 1 is made up. The heat exchanger is supported in the jacket 66 by a glass Y-piece 67 whose ends are located in recesses 68 in the jacket. It is to be noted that the convolutions of each spiral coil are out of register with those of adjacent coils so as to provide a multitude of tortuous passageways for efficient countercurrent gas/liquid contacting. The exchanger shown in Figs. 2 and 3 has the following specifications, viz. cooling surface area=25 sq. ft.; internal diameter of tubes=9/16"; height and diameter of jacket=24" and 12" respectively. It may be noted at this point that, taking any section of the reaction column occupied by a heat exchanger, the cooling surface provided should, in general, be at least 10–15 and preferably at least 20 sq. ft. per cubic foot of reactor.

In operation of the system shown in Figure 1, ethylene at somewhat above atmospheric pressure and at atmospheric temperature, is admitted through line 14 whence it passes upwardly through packed zone 3 into a reaction zone 2. As the same time, liquid bromine at atmospheric temperature is admitted by gravity feed through line 13 and cooling water is passed through all the heat exchangers 7—12. The bromine entering through line 13 pours onto the surfaces of the cooling coils of the heat exchangers 7 and 8 and enters into reaction with ethylene to form liquid ethylene dibromide, such reaction taking place partly homogeneously in the liquid phase, i.e. a liquid phase composed of ethylene dibromide and dissolved bromine and ethylene, and partly heterogeneously on the surfaces of the cooling coils through which cold water is passed at a sufficient rate to take up the heat of reaction. Some reaction also takes place in the gas phase. Liquid product dibromide formed in the region of cooling coils 7 and 8 (the function of upper cooling coils 9—12 will be described later) drains downwardly as a discontinuous liquid phase into packed zone 3 wherein it is stripped of by far the major part of its bromine content—which may be as much as 30% at the top of packed zone—by the ascending ethylene. The temperature in the packed zone 3, at least in the upper part thereof, is too high to permit of any substantial reaction between bromine and ethylene and the primary function of the latter is to vaporise the bromine in the liquid product dibromide and return it to the reaction zone, such vaporisation incidentally resulting in the cooling of the dibromide product as it passes down through the packed zone 3. A small amount of ethylene dibromide is also vaporized in the packed section and this likewise passes back up the column where it is re-condensed and returned to the packed zone 3. Product dibromide is, as previously indicated, withdrawn as a continuous stream through line 16.

At very low throughputs of the reactants, only the two lower cooling coils 7 and 8 may play any significant part in the process. However, as the throughput is increased and the capacity of the lower cooling coils is taken up, the upper coil 9—12 come progressively into play, bromine vaporised from the input liquid stream being condensed on the surface of such upper coils or dissolved together with ethylene in any liquid ethylene dibromide condensed or formed in situ on the surface of the coils. The system is thus extremely flexible as regards throughput of reactants and the capacity of the column is only exceeded when the packed zone 3 or lower cooling coil 7 becomes flooded.

The vent gas from the reaction, which is removed from column 1 through line 15 and passed to vent gas scrubber 49, contains hydrobromic acid together with any excess ethylene and any inert impurities present in the ethylene feed, but is free of ethylene dibromide and bromine since any vapours of these substances present in the upper part of the tower are condensed by the cooling coils before they can reach the outlet for the vent gas. The hydrobromic acid in the vent gas is removed by the water passing downwardly through packed scrubbing zone 52 from line 48 and the scrubbed vent gas passes through condensing zone 51 wherein most of the moisture therein is condensed out, this being necessary for the proper functioning of vent gas rotameter $G_8$ through which the vent gas passes via line 57. A dilute aqueous solution of hydrobromic acid is withdrawn from line 53 and passed to a conventional system (not shown in Figure 1) for recovery of its bromine content.

The new continuous process of the invention is preferably controlled, either manually or automatically, by measuring some quantity whose value is a function of the flow rate of vent gas leaving the reaction zone and controlling the feed rate of ethylene and/or bromine in accordance with the value of the measured quantity. Conveniently the process is operated with an excess of ethylene and the quantity measured is the flow rate of excess ethylene from the reaction zone. If the ethylene feed contains a significant proportion of inert impurities, the measured quantity could be the flow rate of these inerts in the vent gas and in such case the process could be operated without using an excess of ethylene although less conveniently. If, as is preferred, excess ethylene is used the ethylene content of the vent gas may be recovered by contacting it with the bromine feed to the reactor, e.g. by countercurrently contacting it with the liquid bromine feed prior to the entry of the latter into the reaction zone.

The system shown in Figure 1 of the drawings is adapted for manual control using an excess of ethylene. Thus manual control of the system may be exercised by observing by means of the vent gas rotameter $G_8$, the amount of scrubbed vent gas leaving the system, such amount for a given ethylene feed rate being a function of the excess ethylene employed and the concentration of inert gases in the feed, and manually adjusting the ethylene feed, by means of valve $V_8$ or $V_9$, so as to maintain a constant predetermined level of vent gas leaving the system. In general, the system of Figure 1 may be readily controlled in the same manner described using an excess of ethylene of the order of only 3% or less. The excess ethylene in the vent gas may be recovered, as mentioned above, by passing the vent gas through the body of liquid bromine which supplies the reactor; a device for this purpose termed an ethylene scrubber is shown in Figure 4 and will be described later.

The process of the invention lends itself to automatic control and a suitable system for this purpose is shown in Figure 4 of the drawing to which reference will now be made.

The system shown in Figure 4 is, apart from the control arrangement, similar to that of Figure 1 and like parts are identified by like reference numbers. Parts not identified by reference numerals in Figure 4 are identical with the corresponding parts of Figure 1. The main difference between the systems of Figures 1 and 4 is that the manual control panel and associated flow lines and valves of Figure 1 are replaced in Figure 4 by instruments for automatic control together with appropriate mechanism control lines and valves. Also included in the system of Figure 4 is an ethylene scrubber for recovery of ethylene in the vent gas from the reactor, which device as noted above can also advantageously be included in the system of Figure 1.

Referring now in detail to Figure 4, ethylene is admitted to the system through line 23, automatic control valve $V_{20}$ and ethylene buffer vessel 24, which is provided with a pressure recorder controller PRC1 which serves to measure and record the pressure of ethylene in vessel 24 and also maintain same at a constant predetermined value by means of a control line 70 which operates valve $V_{20}$. The ethylene flow rate into the reactor through line 71 is controlled by a valve $V_{21}$ which is itself automatically operated by a control line 72 in a manner to be described later. For control purposes, the ethylene flow rate into the reactor is arranged to be in excess of that consumed in the reaction so that the vent gas withdrawn from the top of reactor through line 15 always contains some unreacted ethylene. The vent gas withdrawn through line 15 is passed through a scrubber 49 the packed section 50 and condenser 51 of which are supplied with water through valves $V_{18}$ and $V_{22}$ via lines 31 and 32. After leaving scrubber 49, the ethylene-containing vent gas is passed through line 73 to an ethylene scrubber 74. The ethylene scrubber 74 is similar in construction to the vent gas scrubber 49 and comprises firstly a condenser 75 through which cooling water is admitted through line 32 and valve $V_{23}$ and from which cooling water is removed through line 76, and secondly a packed section 77 through which the ethylene-containing vent gas ascends from line 73 countercurrent to liquid bromine admitted above the packed section through line 78 from bromine head tank 19. In operation, the ethylene in the vent gas reacts with the bromine in scrubber 74 and the resulting mixture of bromine and ethylene dibromide is passed into the reaction zone from the bottom of scrubber 74 through line 79. Any bromine vaporized in scrubber 74 due to heat of reaction is condensed by condenser 75 so that the vent gas removed by scrubber 74 to atmosphere by line 80 is bromine-free. A flow recorder controller FRC2 measures and records the flow rate of ethylene-containing vent gas in line 73 and at the same time operates, through control line 72, the input ethylene flow rate valve $V_{21}$ in such a manner that any fluctuation in vent gas flow rate is automatically compensated for by adjustment of the input ethylene flow rate as to maintain a constant vent gas flow rate.

With a constant bromine feed rate, satisfactory automatic control of the system can be maintained solely in the manner just described. However, it frequently happens that the bromine feed rate cannot conveniently be kept at a constant level due to fluctuation in the rate of production of the bromine plant with which the system is usually associated. Accordingly means are shown in Figure 4 for effecting automatic adjustment of the ethylene input feed rate in accordance with any fluctuations in bromine feed rate, such means consisting of a bromine flow recorder controller FRC1 which measures and records the bromine feed rate through line 78 and which, through a control line 81, is cascaded with ethylene flow recorder controller FRC2 in such a way that the set point of the latter, i.e. the setting which predetermines the level of vent gas flow through line 73, is adjusted in accordance with the bromine feed rate. With this arrangement, it is ensured that the ethylene feed rate is proportional to the bromine feed rate and that the amount of ethylene in the vent gas is proportional to the bromine feed rate in order to prevent overheating in the ethylene scrubber 74 at low bromine feed rates. The arrangement also takes into account the fact that the vent gas flow rate is dependent on the concentration of inerts in the ethylene feed. The cascading of the two flow recorder controllers FRC1 and FRC2 has the additional advantage of increasing the response of the ethylene feed control to variations in the bromine feed rate.

When operating in accordance with the automatic control arrangement just described, it is best to use a significant excess of ethylene so that the vent gas flow rate is at a level conveniently measurable by presently available instruments which have sufficient power to operate a control mechanism. Even using an ethylene feed containing a relatively high proportion of inerts, it is still desirable to operate using a sizable excess of ethylene. The recording and controlling instruments identified in the drawing as PRC1, FRC1 and FRC2 may, of course, take many different known forms but essentially they consist of means for measuring and recording the appropriate variable, i.e. pressure or flow rate, and means, which with their associated control lines, are capable of effecting a mechanical operation, such as opening or closing a valve in accordance with changes of the measured variable. The instrument control lines will usually be pneumatically, hydraulically or electrically operated.

When operating with an excess of ethylene and recovering the excess ethylene in the vent gas by reacting it with bromine feed externally of the main reactor, some ethylene dibromide product will of course be admitted with the bromine and, in this case, the molar ratio of ethylene dibromide to bromine entering the reactor should be kept as low as is practicable and preferably such ratio should not exceed 1:1. The reason for this is that entry of product dibromide with the bromine feed tends to impair product quality as the following data show.

Ethylene dibromide was recycled in a continuous system substantially as described with reference to Fig. 1, the ethylene dibromide entering the reactor with the bromine feed at such a rate that the volume ratio of ethylene dibromide to bromine feed was 12:1. The ethylene dibromide before the recycle operation had a distillation range of 1.4° C. After four hours of recycling the ethylene dibromide leaving the reactor had a distillation range of 2.1° C.

The above data clearly show the effect on product quality of increasing the residence time of ethylene dibromide product in the reaction zone and thus demonstrate an important advantage of the present process which does not involve the addition to the reaction zone of large amounts of product dibromide whether for cooling purposes or to serve as a reaction medium. Another disadvantage of adding or recycling large amounts of product dibromide to the reaction zone is that the capacity of the reaction zone is not fully utilized.

The reactor shown in Figure 1 of the drawing is drawn approximately to scale and for a 12″ internal diameter column provided with the commercially available heat exchangers described earlier in connection with Figures 2 and 3 and using ½″ x ½″ glass Raschig rings in a packed section 4 and ⅜″ x ⅜″ rings in packed section 5, the following typical and specific operating data may be given:

| | Typical Data | Actual Run |
|---|---|---|
| Ethylene flow rate into column 1, cu.ft./min. at NTP | 10–110 | 53 |
| Bromine flow rate in column 1, tons/24 hrs | 3–22.5 | 15 |
| Cooling water (at 10° C.) supply to line 31, Imp. gals./min | 60–80 | 72 |
| Cooling water (at 10° C.) supply to scrubber via line 48, imp. gals/hr | 30–60 | 45 |
| Vent gas flow rate through rotameter $G_8$, cu.ft./mm. | 0.5–5 | 1.4 |
| Ethylene dibromide flow rate through rotameter $G_7$, tons/24 hrs | 3.5–27 | 17.6 |
| Thermometer Temps., 0° C: | | |
| $T_1$ | 20–30 | 25 |
| $T_2$ | 40–65 | 65 |
| $T_3$ | 60–85 | 84 |
| $T_4$ | 80–90 | 89 |
| $T_5$ | 80–100 | 84 |
| $T_6$ | 60–85 | 68 |
| $T_7$ | 80–90 | 88 |
| $T_8$ | 70–90 | 74 |
| $T_9$ | ¹10–95 | 18 |
| $T_{10}$ | ¹10–60 | 15 |
| $T_{11}$ | 10–25 | 14 |

¹ The wide range quoted is due to the fact that at low feed rates the upper part of column 1 is outside the actual zone of reaction.

In runs which have been made on a 12″ diameter column operated in accordance with the data given above, the quality of the product dibromide has been in every respect superior to that of the product from a conventional batch reactor, particularly in respect of purity and lower acidity and hydrolyzability, irrespective of the rate of ethylene dibromide production which, as indicated, may be varied from 3 to 27 tons a day. The superior properties of the product of the new continuous process will be apparent from the typical comparative data given below:

| | Ethylene Dibromide from Continuous Process | Ethylene Dibromide from Batch Process |
|---|---|---|
| Distillation Range, 0° C | 0.5–0.7° C | 2.30° C. |
| Freezing Point, 0° C | 9.45–9.60° C | 9.13° C. |
| Specific Gravity | 2.180 | 2.179. |

The hydrolyzability of the product from the continuous process, measured after neutralization, is far less than that from the batch process. Hydrolyzability is measured by successively extracting a given quantity of the sample with an equal volume of the $CO_2$—free water by shaking in a shaking machine for ten minutes and then titrating the extract with $n/100$ NaOH, the results being expressed as the number of c.c.'s of NaOH solution required to effect neutralisation; a low hydrolyzability is shown when the acidity of successive extracts drops rapidly to zero. When the continuous process is operated under proper conditions, the hydrolyzability of the product is typically 0.1 to nil, 0.05 to nil, and nil for successive extractions, while that for a product from a batch operation is rarely below 1.0 for the first extraction and does not reach a zero value even after a great number of extractions.

Conventional batch reactors usually produce a maximum of 3.7 tons of ethylene dibromide per day. Thus the above described continuous reactor has a production capacity equal to that of nearly eight of such conventional batch reactors.

The ethylene dibromide product withdrawn from a continuously operated column as above described still contains some unreacted bromine and ethylene and, in accordance with a preferred operating procedure these unreacted materials are substantially eliminated by photochemical reaction (cf. H. S. Davis, J. Am. Chem. Soc., 1928, 50, 2769). The light employed in this photochemical treatment may be either visible or ultra-violet, the most effective wavelengths being from 3800 A to 5000 A. In the systems shown in Figures 1 and 4 of the drawings, the photochemical treatment may be applied either to the ethylene dibromide passing down the lower half of packed zone 3 or to stream flowing through line 16 (e.g. by means of mercury vapour lamps 55) or both. The exposure to light may be achieved by external lights or internal lights which, for example, may be placed inside the lower half of packed zone 3.

As already indicated, the product dibromide from the new continuous process is greatly superior in quality as regards its reduced tendency toward hydrolysis in the presence of moisture, such hydrolysis being undesirable because it results in the production of acidic substances which, in turn, give rise to corrosion problems on storage and handling of the product. However, it has been found, in accordance with a further aspect of this invention, that the already reduced tendency towards hydrolysis of the dibromide product from the continuous process can be completely eliminated by the simple procedure of continuously treating the dibromide product stream with steam. Advantageously, the steam is admitted into the dibromide product stream after it has left the column and the treatment takes place in a concurrent fashion. The amount of steam required does, of course, depend on the hydrolyzability of the product before the steam treatment. Preferably, however, sufficient steam is used to raise the temperature of the product from approximately room temperature to at least 50° C.; thus, for example, from about 5–10 wt.% steam based on ethylene dibromide may be used to raise the temperature to about 50–70° C. In the systems shown in Figures 1 and 4 of the drawings, steam for the purpose indicated is admitted into the product dibromide stream through line 56. This treatment with steam hydrolyzes all the acid forming impurities in the dibromide and the resulting acidic hydrolysis products, mostly hydrobromic acid, may then be neutralized with an aqueous solution of soda ash in a separator from which a purified organic layer may be withdrawn. Alternatively, and this is the preferred procedure, the steam-treated product is merely passed into a continuous settler from which the organic phase is removed for neutralisation as before and the aqueous phase is withdrawn for recovery of its hydrobromic acid content. This treatment with steam can also be applied to ethylene dibromide prepared by processes other than the continuous one described herein since the undesirable tendency towards hydrolysis occurs in any dibromide product resulting from the bromination of ethylene unless the reactants are essentially free from moisture. The neutralization treatments just mentioned can be carried out batchwise or in a continuous fashion. When it is possible to feed the column with essentially dry bromine and ethylene, continuous hydrolysis with steam is unnecessary, since the product is free from any hydrolyzable impurities.

While the process of the invention has thus far been particularly described with reference to the production of ethylene dibromide, it may of course be equally well applied to the production of propylene and butylene dibromide under reaction conditions generally similar to those set forth above for ethylene dibromide. Also, the process is applicable, although somewhat less advantageously, to the production of dichlorides and chlorobromides of normally gaseous olefins. Of course, the optimum reaction temperature will vary according to the reactants and the products desired but the general range is determined at the lower end by the freezing point of the dihalide product or halogen reactant whichever is the higher and the upper end of the range by the boiling point of the product.

As an example of a preparation of a dihalide other than ethylene dibromide, a reactor essentially similar to that described with reference to Fig. 1 has been successfully employed for the production of ethylene chlorobromide by using as the halogen feed an equimolar mixture of chlorine and bromine. Thus using a 2½" diameter column substantially as shown in Fig. 1, admitting an equimolar mixture of bromine and chlorine at $-12°$ C. between the two lowermost heat exchangers, there was obtained a product from the bottom of the column which contained, on a molar basis, 67% ethylene chlorobromide, 24% ethylene dibromide and 9% ethylene dichloride. In the above experiment the top three heat exchangers were cooled with circulating ethyl alcohol at $-40°$ C. and the bottom three exchangers were cooled with water at 12° C.; the halogen feed rate was 160 grams/min. and the ethylene feed rate was 1 cu.ft./min.

When utilising the process of the invention for the preparation of the various other dihalides just referred to, it is again advantageous to utilise a slight excess of olefin as described earlier in connection with ethylene dibromide manufacture. Also where excess olefin is used and is recovered by reacting it with halogen externally of the main reaction zone, it will again be desirable to maintain the amount of product dihalide admitted to the main reaction zone at a figure not exceeding 1 mole thereof per mole of halogen feed.

We claim:

1. A continuous process for the preparation of ethylene dibromide which comprises continuously introducing into a vertical column a gaseous feed comprising ethylene and a liquid feed consisting predominantly, on a molar basis, of bromine and reacting the ethylene and bromine in the column to form liquid ethylene dibromide, said vertical column having a lower packed zone and an upper reaction zone containing indirect heat exchange means supplied with liquid coolant and providing in effect a packed cooling section extending across the reaction zone and occupying a substantial portion of the depth of the reaction zone while providing for generally vertical flow of gas and liquid therethrough along paths distributed over the cross-sectional area of the reaction zone, passing the liquid bromine into the reaction zone and the ethylene upwardly through the packed zone and thence into the reaction zone, withdrawing heat through the cooling surfaces in the reaction zone at a rate such as to maintain the interior of the reaction zone at a temperature below the boiling point of ethylene dibromide but not so low as to cause freezing of liquid phase material in the reaction zone, permitting liquid ethylene dibromide product containing dissolved bromine to pass downwardly, over the surfaces of the heat exchange means, into and through the packed zone and countercurrently contacting it therein with the ascending ethylene whereby the major portion of the bromine is stripped out and returned to the reaction zone, maintaining the ethylene dibromide product as a discontinuous liquid phase in the reaction zone and the packed zone, maintaining said zones substantially free from any continuous body of liquid dibromide, continuously withdrawing a stream of product dibromide from the bottom of the packed zone, and continuously withdrawing vent gas from the upper portion of the reaction zone.

2. A process according to claim 1, wherein the bromine is introduced as a liquid stream at an intermediate level in the reaction zone such that a substantial expanse of cooling surface is provided above and below such level and the temperature of the cooling surface above such level is maintained low enough to result in the condensation on such cooling surface of any vaporised bromine and product ethylene dibromide ascending above the level of bromine introduction.

3. A process according to claim 1, including the step of measuring a quantity whose value is a function of the flow rate of vent gas leaving the reaction zone, and controlling the feed rate of at least one of the reactants to maintain said measured quantity at a predetermined value.

4. A process according to claim 1, in which the ethylene feed rate is such that the vent gas contains some unreacted ethylene, and which includes the procedure of measuring a quantity whose value is a function of the flow rate of such unreacted ethylene, and adjusting the ethylene feed rate in response to changes in said measured quantity so as to maintain the flow rate of ethylene in the vent gas at a predetermined level.

5. A process according to claim 1, wherein the feed is free of any significant quantity of recycled ethylene dibromide.

6. A process according to claim 1, wherein the feed contains preformed ethylene dibromide in an amount not exceeding about $\frac{1}{10}$ mole per mole of bromine.

7. A process according to claim 1, wherein the heat exchange means comprise a number of concentric tubular coils spaced from each other and from the inner surface of the column to define paths for vertical fluid flow.

8. A continuous process for the preparation of a dihalide of a normally gaseous olefin by the reaction of the olefin and halogen selected from the group consisting of bromine, chlorine and mixtures of bromine and chlorine which comprises continuously introducing into a reaction zone a feed which comprises the olefin and halogen and 0 to 1 mole of liquid diluent solvent per mole of halogen and reacting the olefin and halogen in said zone to form liquid olefin dihalide; said reaction zone being provided interiorly with heat exchange means which provide, in effect, a packed cooling section extending across the reaction zone and occupying a substantial portion of the depth thereof and adapted to provide for generally vertical flow of gas and liquid therethrough along paths distributed over the cross-sectional area of the reaction zone, withdrawing heat through the surface of said heat exchange means at a rate such as to maintain the interior of the reaction zone at a temperature below the boiling point of the desired dihalide product but not so low as to cause freezing of liquid phase material in the reaction zone, establishing contact between olefin, halogen and product dihalide while the latter flows downwardly, as a discontinuous liquid phase, over the surface of said heat exchange means, maintaining said zone substantially free from liquid dihalide and withdrawing a stream of product dihalide from the reaction zone.

9. A process according to claim 8, wherein the feed to the reaction zone contains liquid bromine as the halogen and is free of any significant quantity of recycled product dibromide.

10. A continuous process for the preparation of a dibromide of a normally gaseous olefin by the reaction of the olefin and bromine which comprises continuously introducing into a reaction zone a gaseous feed comprising olefin and a liquid feed composed substantially entirely of liquid bromine and reacting the olefin and bromine in said zone to form liquid olefin dibromide, said reaction zone being provided interiorly with heat exchange means which provide, in effect, a packed cooling section extending across the reaction zone and occupying a substantial portion of the depth of the reaction zone and adapted to provide for generally vertical flow of gas and liquid therethrough along paths distributed over the cross-sectional area of the reaction zone, withdrawing heat through the surface of said heat exchange means at a rate such as to maintain the interior of the reaction zone at a temperature below the boiling point of the dihalide product but not so low as to cause freezing of liquid phase material in the reaction zone establishing contact between olefin, bromine and product dibromide while the latter flows downwardly, as a discontinuous liquid phase, over the surface of said heat exchange means, maintaining said zone substantially free from any continuous body of liquid dibromide, and withdrawing a stream of product dibromide from the reaction zone.

11. A process according to claim 10, wherein the feed is devoid of any significant quantity of recycled olefin dibromide.

12. A continuous process for the preparation of a dibromide of a normally gaseous olefin by the reaction of the olefin and bromine which comprises continuously introducing into a vertical glass column a feed which contains liquid bromine and gaseous olefin in a molar ratio from 1.25:1 to 1:2 but which contains no substantial quantity of liquid solvent for the reaction, and reacting the olefin and bromine in said column to form liquid dibromide, said column being provided interiorly with glass heat exchange means which provide, in effect, a packed cooling section extending across the column and occupying a substantial portion of the depth thereof and adapted to provide for generally vertical flow of gas and liquid therethrough along paths distributed over the cross-sectional area of the column, passing the bromine downwardly and the olefin upwardly through said packed cooling section, withdrawing heat through the surface of said heat exchange means at a rate such as to maintain the interior of the column in the vicinity of the cooling section at a temperature not exceeding about 100° C. but not below the freezing point of the bromine or the dibromide product, maintaining contact between olefin, bromine and product dibromide while the latter flows downwardly, as a discontinuous liquid phase, over the surfaces of said heat exchange means countercurrent to the ascending olefin, maintaining said column substantially free from any continuous body of liquid dibromide and recovering a substantially bromine-free dibromide product.

13. A process according to claim 12, wherein the olefin:bromine feed ratio is in the range from substantially 1:1 to 1.1:1.

14. Apparatus for the reaction of fluid materials to produce a liquid product which comprises a vertical tubular column, indirect heat exchange means disposed within an upper portion of said column and comprising a plurality of independent tubular heat exchange means disposed one above the other in the column and each providing, in effect, at least one packed heat exchange section extending across the column, said heat exchange means extending vertically throughout a substantial portion of the column and providing a number of generally vertically extending paths distributed over the cross-sectional area of the column, a mass of solid packing pieces supported in the lower portion of the column to provide a packed zone extending thereacross, a flow path through the column being provided which is adapted to permit a downward liquid flow distributed over substantially the whole cross-sectional area of the column from and through said heat exchange sections to the bottom of said packed zone, an inlet for admitting fluid material into the interior of said column at a level intermediate between the uppermost and lowermost heat exchange section, an inlet in the lower portion of said column for passing gaseous material up through said packed zone, and outlet for fluid material below said packed zone, and an outlet for fluid material above the uppermost heat exchange section.

15. Apparatus according to claim 14, wherein the heat exchange means comprise a number of concentric tubular coils spaced from each other and the inner surface of the column to define paths for vertical fluid flow.

References Cited in the file of this patent

UNITED STATES PATENTS

| | | |
|---|---|---|
| 2,022,616 | Berliner | Nov. 26, 1935 |
| 2,183,094 | Fenske et al. | Dec. 12, 1939 |
| 2,281,705 | Merril | May 5, 1942 |
| 2,451,433 | Davis | Oct. 12, 1948 |
| 2,705,699 | Bresee | Apr. 5, 1955 |
| 2,746,999 | Gunkler et al. | May 22, 1956 |